(12) United States Patent
Tamura

(10) Patent No.: US 11,765,291 B2
(45) Date of Patent: Sep. 19, 2023

(54) MEDIUM CONVEYING DEVICE AND DETERMINATION METHOD

(71) Applicant: PFU Limited, Ishikawa (JP)

(72) Inventor: Kenichi Tamura, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/501,869

(22) Filed: Oct. 14, 2021

(65) Prior Publication Data

US 2022/0046136 A1    Feb. 10, 2022

Related U.S. Application Data

(63) Continuation of application No. 16/915,568, filed on Jun. 29, 2020, now Pat. No. 11,178,301.

(30) Foreign Application Priority Data

Jul. 31, 2019    (JP) ................................ 2019-141236

(51) Int. Cl.
    *B65H 43/08*       (2006.01)
    *H04N 1/00*        (2006.01)
    *G03G 15/00*       (2006.01)

(52) U.S. Cl.
    CPC ......... *H04N 1/00689* (2013.01); *B65H 43/08* (2013.01); *G03G 15/602* (2013.01);
    (Continued)

(58) Field of Classification Search
    CPC .... B65H 43/08; B65H 2553/414; B65H 7/02; B65H 7/14
    See application file for complete search history.

(56) References Cited

U.S. PATENT DOCUMENTS

| 4,642,457 A | 2/1987 | Watanabe |
|---|---|---|
| 7,529,493 B2 | 5/2009 | Shiba et al. |
| | (Continued) | |

FOREIGN PATENT DOCUMENTS

| JP | S4892980 U | 11/1973 |
|---|---|---|
| JP | S61-266985 A | 11/1986 |
| | (Continued) | |

OTHER PUBLICATIONS

Non-Final Office Action issued in U.S. Appl. No. 16/915,568, dated Sep. 18, 2020.

(Continued)

*Primary Examiner* — Thomas A Morrison
(74) *Attorney, Agent, or Firm* — McDermott Will & Emery LLP

(57) ABSTRACT

In a medium conveying device, a projector projects light, a projection light amount of the light changes, at every fixed time, to a first projection light amount and a second projection light amount less than the first projection light amount, a receiver receives the light projected from the projector, a processor determines, at fixed sampling timings, whether a reception light amount of the receiver is at a first reception light level or a second reception light level smaller than the first reception light level, determines, when the reception light amount alternately changes to the first reception light level and the second reception light level, that a medium is not present on a conveying path, and determines, when the reception light amount is fixed to either the first reception light level or the second reception light level, that the medium is present on the conveying path.

5 Claims, 8 Drawing Sheets

(52) U.S. Cl.
CPC ......... *G03G 15/607* (2013.01); *H04N 1/0057* (2013.01); *H04N 1/00734* (2013.01); *B65H 2553/414* (2013.01)

(56) References Cited

U.S. PATENT DOCUMENTS

| | | | |
|---|---|---|---|
| 2002/0176059 A1* | 11/2002 | Lucey | B65H 43/08 |
| | | | 355/75 |
| 2003/0025090 A1* | 2/2003 | Iwasaki | B65H 7/14 |
| | | | 250/559.12 |
| 2006/0012774 A1 | 1/2006 | O'Mahony et al. | |
| 2008/0019751 A1* | 1/2008 | Castillo | G03G 15/6561 |
| | | | 399/406 |
| 2010/0238253 A1 | 9/2010 | Inoue | |
| 2011/0292476 A1 | 12/2011 | Yomogida | |
| 2015/0210495 A1* | 7/2015 | Hayes | B65H 29/58 |
| | | | 271/265.04 |

FOREIGN PATENT DOCUMENTS

| | | |
|---|---|---|
| JP | 2000-292990 A | 10/2000 |
| JP | 2003-300648 A | 10/2003 |
| JP | 2007-193193 A | 8/2007 |
| JP | 2009-234787 A | 10/2009 |
| JP | 2010-215375 A | 9/2010 |
| JP | 2011-254216 A | 12/2011 |

OTHER PUBLICATIONS

Final Office Action issued in U.S. Appl. No. 16/915,568, dated Apr. 27, 2021.
Notice of Allowance issued in U.S. Appl. No. 16/915,568, dated Jul. 16, 2021.
Japanese Office Action issued in corresponding Japanese Patent Application No. 2019-141236, dated Jan. 24, 2023, with English translation.

* cited by examiner

MEDIUM CONVEYING DEVICE AND DETERMINATION METHOD

CROSS-REFERENCE TO RELATED APPLICATION

This application is a Continuation of U.S. patent application Ser. No. 16/915,568, filed Jun. 29, 2020, which claims the benefit of Japanese Patent Application No. 2019-141236 filed in Japan on Jul. 31, 2019, the entire disclosures of which Applications are incorporated by reference herein.

FIELD

The present disclosure relates to a medium conveying device and a determination method.

BACKGROUND

In some scanner devices, a medium to be read by a scanner device (hereinafter, "medium to be read") is inserted into a conveying path inside the scanner device from an opening of the scanner device. Some scanner devices, into which a medium to be read is inserted, determine whether the medium to be read is present on a conveying path with an optical sensor. For example, when a reflective optical sensor is used for the determination, the light projected from a projector is reflected by the medium to be read, and the medium to be read is determined to be present on the conveying path when the reception light amount of a receiver increases. For example, when a transmissive optical sensor is used for the determination, the light projected from a projector is blocked by the medium to be read, and the medium to be read is determined to be present on the conveying path when the reception light amount of a receiver decreases.

Examples of related-art are described in JP-A-2000-292990, and in JP-A-2011-254216.

If ambient light enters a receiver of an optical sensor, the reception light amount of the receiver increases, and this can cause erroneous determination whether a medium to be read is present on a conveying path. That is, when a reflective optical sensor is used for the determination, the reception light amount of the receiver increases due to ambient light, and this can cause erroneous determination that a medium to be read is present although the medium to be read is not present on the conveying path. Alternatively, when a transmissive optical sensor is used for the determination, the reception light amount of the receiver increases due to ambient light, and this can cause erroneous determination that a medium to be read is not present although the medium to be read is present on the conveying path.

SUMMARY

According to an aspect of an embodiment, a medium conveying device includes a first conveying path, an optical sensor, and a processor. The first conveying path includes a first opening, an upper surface, and a lower surface. The first conveying path is used to convey a first medium inserted from the first opening. The optical sensor includes a projector and a receiver. The projector is arranged on the lower surface side and projects light toward the upper surface. A projection light amount of the light changes, at a fixed time, to a first projection light amount and to a second projection light amount less than the first projection light amount. The receiver is arranged on the upper surface side to face the projector and receives the light projected from the projector. The processor determines, at fixed sampling timings, whether a reception light amount of the receiver is at a first reception light level or a second reception light level smaller than the first reception light level. The processor determines, when the reception light amount alternately changes to the first reception light level and the second reception light level, that the first medium is not present on the first conveying path. The processor determines, when the reception light amount is fixed at either the first reception light level or the second reception light level, that the first medium is present on the first conveying path.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the present disclosure will be explained with reference to accompanying drawings. In the following embodiments, the same components are denoted by the same reference signs.

[a] First Embodiment

Configuration of Scanner Device

Figure 1:
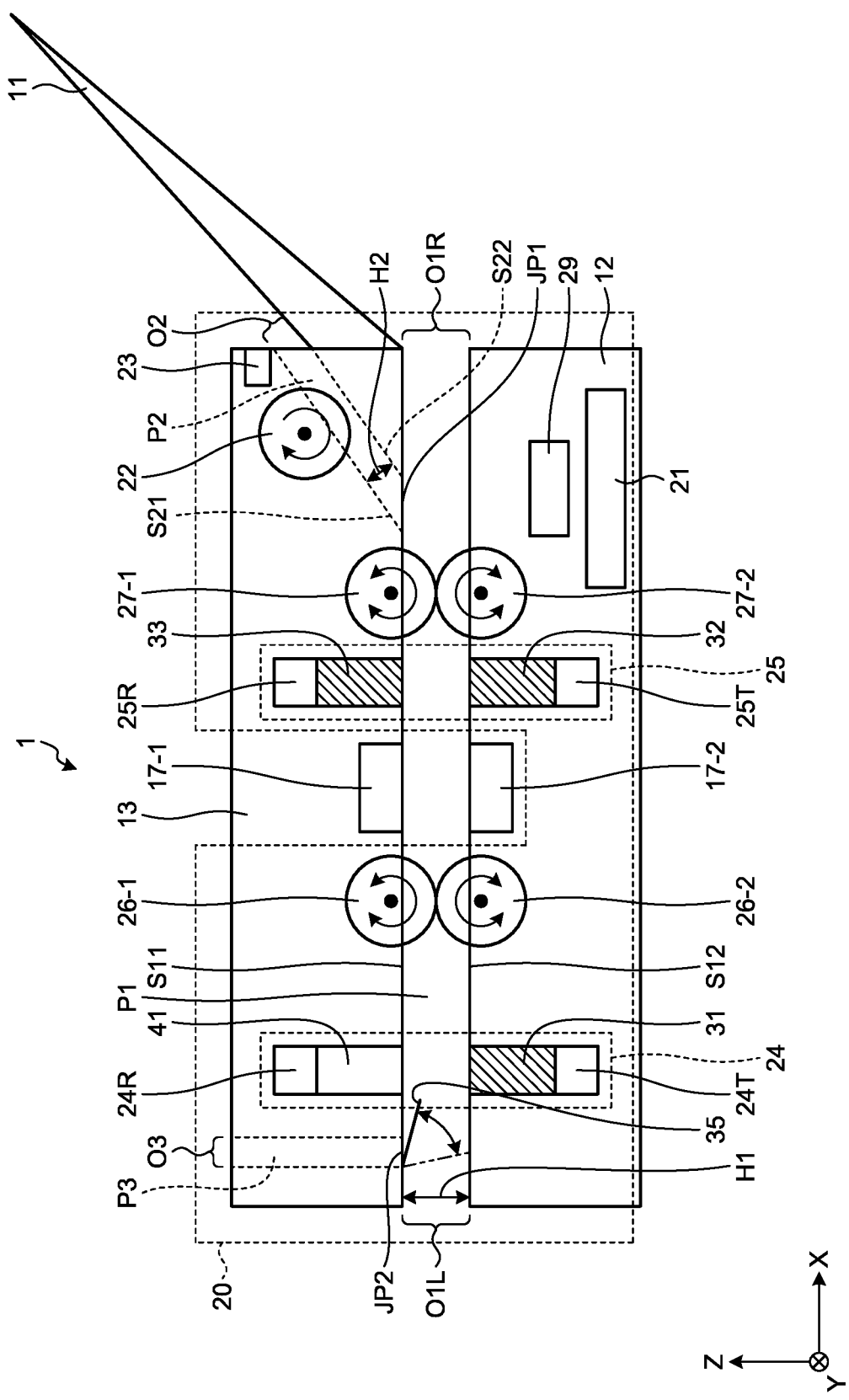
FIG. 1 is a diagram for explaining a configuration example of a scanner device according to a first embodiment of the present disclosure.

FIG. 1 is a diagram for explaining a configuration example of a scanner device according to a first embodiment of the present disclosure. An example of a medium to be read that is inserted in a scanner device 1 includes a manuscript with characters and figures.

As shown FIG. 1, the scanner device 1 includes a feeding tray 11, a lower housing 12, an upper housing 13, medium reading units 17-1 and 17-2, and a medium conveying device 20.

The medium conveying device 20 includes a processor 21, a memory 29, a pick roller 22, an empty sensor 23, transmissive optical sensors 24 and 25, conveying rollers 26-1, 26-2, 27-1, and 27-2, conveying paths P1, P2, and P3, and a flap 35. The fulcrum of the flap 35 is formed on the upper housing 13. The fulcrum of the flap 35 is positioned at the rear end of the flap 35, and the state in which the tip of the flap 35 is raised to the upper housing 13 is the initial position of the flap 35. The pick roller 22, the conveying rollers 26-1, 26-2, 27-1, and 27-2, and the flap 35 are driven by a motor (not shown).

The medium reading units 17-1 and 17-2 are implemented as hardware by, for example, contact image sensor (CIS) type image sensors. An example of the processor includes a central processing unit (CPU), a digital signal processor (DSP), or a field programmable gate array (FPGA). In addition, an example of the memory includes a random access memory (RAM), such as a synchronous dynamic random access memory (SDRAM), a read only memory (ROM), or a flash memory.

The conveying path P1 includes an opening O1L formed on the left side surface of the scanner device 1, an opening O1R formed on the right side surface of the scanner device 1, an upper surface S11, and a lower surface S12. The upper surface S11 of the conveying path P1 corresponds to the lower surface of the upper housing 13, and the lower surface S12 of the conveying path P1 corresponds to the upper surface of the lower housing 12. That is, the conveying path P1 is formed between the upper housing 13 and the lower housing 12. The lower surface S12 is formed of a non-reflective member that does not reflect ambient light. The conveying path P1 is used to convey a medium to be read inserted from the opening O1L (hereinafter, "first medium to be read"). The first medium to be read is inserted from the opening O1L normally by a human hand.

The conveying path P2 includes an opening O2 formed on the right side surface of the upper housing 13, an upper surface S21, and a lower surface S22. The conveying path P2 is used to convey a medium to be read inserted from the opening O2 (hereinafter, "second medium to be read"). The second medium to be read placed on the feeding tray 11 is inserted from the opening O2.

Here, the conveying path P2 joins the conveying path P1 at a junction JP1 positioned midway through the conveying path P1. The width H1 of the openings O1L and O1R of the conveying path P1 in the height direction (that is, the distance between the upper surface S11 and the lower surface S12) is larger than the width H2 of the opening O2 of the conveying path P2 in the height direction (that is, the distance between the upper surface S21 and the lower surface S22). Since the width H1 is larger than the width H2, a thick medium to be read (hereinafter, "thick medium") is normally inserted into the opening O1L, and a thin medium to be read (hereinafter, "thin medium") is inserted into the opening O2. That is, the thickness of the first medium to be read is normally larger than the thickness of the second medium to be read.

The conveying path P3 includes an opening O3 formed on the upper surface of the upper housing 13, and joins the conveying path P1 at a junction JP2 positioned midway through the conveying path P1.

The transmissive optical sensor 24 includes a projector 24T, a receiver 24R, a light guide tube 31, and a hole 41. The projector 24T and the receiver 24R are arranged to face each other, and the light projected from the projector 241 toward the upper surface S11 through the light guide tube 31 passes through the hole 41 and is received by the receiver 24R. The projector 24T and the light guide tube 31 are arranged on the lower surface S12 side, and the receiver 24R and the hole 41 are arranged on the upper surface S11 side. The light guide tube 31 is arranged between the projector 241 and the lower surface S12, and guides the light projected from the projector 241 to the lower surface S12. The hole 41 passes through between the upper surface S11 and the receiver 24R. The projection light amount of the projector 241 changes to a first projection light amount QH and a second projection light amount QL less than the first projection light amount QH at a fixed time T1 under the control of the processor 21.

The transmissive optical sensor 25 includes a projector 25T, a receiver 25R, and light guide tubes 32 and 33. The projector 25T and the receiver 25R are arranged to face each other, and the light projected from the projector 25T toward the upper surface S11 through the light guide tube 32 is received by the receiver 25R through the light guide tube 33. The projector 25T and the light guide tube 32 are arranged on the lower surface S12 side, and the receiver 25R and the light guide tube 33 are arranged on the upper surface S11 side. The light guide tube 32 is arranged between the projector 25T and the lower surface S12, and guides the light projected from the projector 25T to the lower surface S12. The light guide tube 33 is arranged between the upper surface S11 and the receiver 25R, and guides, to the receiver 25R, the light guided by the light guide tube 32 and then reaching the upper surface S11 from the lower surface S12. The projection light amount of the projector 25T is kept constant at the first projection light amount QH under the control of the processor 21.

The processor 21 determines, when the reception light amount of the receiver 24R (hereinafter, "first reception light amount") is equal to or greater than a threshold TH1, that the first reception light amount is at a first reception light level, and determines, when the first reception light amount is less than the threshold TH1, that the first reception light amount is at a second reception light level less than the first reception light level. The threshold TH1 is stored in the memory 29 in advance. Hereinafter, the first reception light level is also referred to as a "high level H", and the second reception light level less than the first reception light level is also referred to as a "low level L".

The processor 21 further determines, when the reception light amount of the receiver 25R (hereinafter, "second reception light amount") is equal to or greater than the threshold TH1, that the second reception light amount is at the high level H, and determines, when the second reception light amount is less than the threshold TH1, that the second reception light amount is at the low level L.

Conveying First Medium to be Read

When the first medium to be read is inserted from the opening O1L on the conveying path P1 in the +X direction while the tip of the flap 35 is raised toward the upper housing 13, the light projected from the projector 24T is blocked by the first medium to be read, and the first reception light amount decreases from the high level H to the low level L. The processor 21 determines that the first medium to be read is present on the conveying path P1 based on the first reception light amount as to be described later, and starts rotating the conveying rollers 26-1 and 27-1 counterclockwise and rotating the conveying rollers 26-2 and 27-2 clockwise. When the first medium to be read is further inserted in the +X direction and the leading end of the first medium to be read reaches between the conveying roller 26-1 and the conveying roller 26-2, the first medium to be read is conveyed on the conveying path P1 in the +X direction by the conveying rollers 26-1 and 26-2.

When the first medium to be read is conveyed in the +X direction by the conveying rollers 26-1 and 26-2 and the leading end of the first medium to be read reaches the transmissive optical sensor 25, the light projected from the projector 25T is blocked by the first medium to be read, and the second reception light amount decreases from the high level H to the low level L. When the second reception light amount decreases from the high level H to the low level L, the processor 21 temporarily stops rotating the conveying rollers 26-1, 26-2, 27-1, and 27-2.

When the rotation of the conveying rollers 26-1, 26-2, 27-1, and 27-2 is temporarily stopped and, then, a "scan start button" (not shown) of the scanner device 1 is pressed by an operator, the processor 21 starts rotating the conveying rollers 26-1 and 27-1 counterclockwise again and rotating the conveying rollers 26-2 and 27-2 clockwise. When the first medium to be read is further conveyed on the conveying path P1 in the +X direction by the conveying rollers 26-1 and 26-2 and the leading end of the first medium to be read reaches between the conveying roller 27-1 and the conveying roller 27-2, the first medium to be read is conveyed on the conveying path P1 in the +X direction by the conveying rollers 27-1 and 27-2.

Then, the light projected from the projector 25T is received by the receiver 25R when the rear end of the first medium to be read passes the transmissive optical sensor 25, and the second reception light amount increases from the low level L to the high level H. When the second reception light amount temporarily decreases from the high level H to the low level L according to the conveyance of the first medium to be read on the conveying path P1 in the +X direction and, then, increases from the low level L to the high level H again, the processor 21 reverses the rotating direction of the conveying rollers 26-1, 26-2, 27-1, and 27-2 to rotate the conveying rollers 26-1 and 27-1 clockwise and to rotate the conveying rollers 26-2, and 27-2 counterclockwise. Thus, the conveying direction of the first medium to be read on the conveying path P1 is reversed from the +X direction to the −X direction. When the rear end of the first medium to be read reaches the transmissive optical sensor 25 according to the reverse of the conveying direction of the first medium to be read from the +X direction to the −X direction, the light projected from the projector 25T is blocked by the first medium to be read, and the second reception light amount decreases from the high level H to the low level L.

The processor 21 starts reading the first medium to be read with the medium reading units 17-1 and 17-2 when the conveying direction of the first medium to be read is reversed from the +X direction to the −X direction. According to the conveyance of the first medium to be read on the conveying path P1 in the −X direction, the first medium to be read is read by the medium reading units 17-1 and 17-2. The upper face of the first medium to be read is read by the medium reading unit 17-1, and the lower face of the first medium to be read is read by the medium reading unit 17-2. The first medium to be read that has been read is then discharged from the opening O1L.

In addition, the light projected from the projector 25T is received by the receiver 25R when the leading end of the first medium to be read passes the transmissive optical sensor 25 according to the conveyance of the first medium to be read in the −X direction, and the second reception light amount increases from the low level L to the high level H. After a predetermined time PT passes from a time TA when the second reception light amount temporarily decreases from the high level H to the low level L according to the conveyance of the first medium to be read on the conveying path P1 in the −X direction and, then, increases from the low level L to the high level H again, the processor 21 stops rotating the conveying rollers 26-1, 26-2, 27-1, and 27-2.

Conveying Second Medium to be Read

Figure 2:
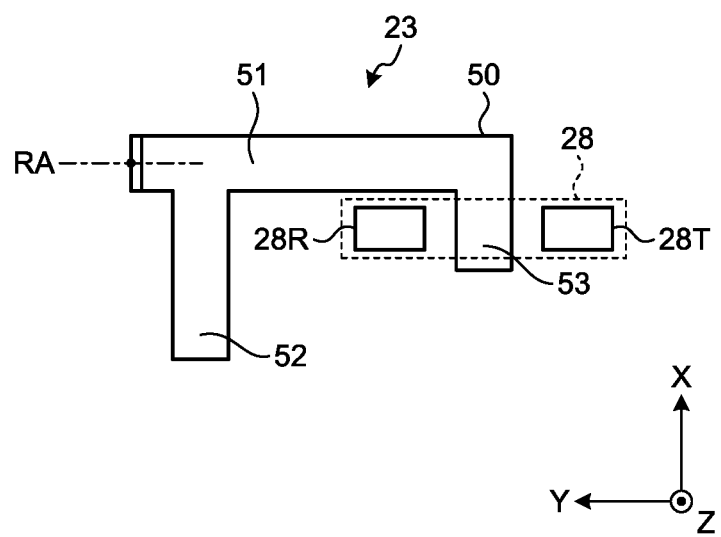
FIG. 2 is a diagram for explaining a configuration example of an empty sensor according to the present disclosure.
Figure 3:
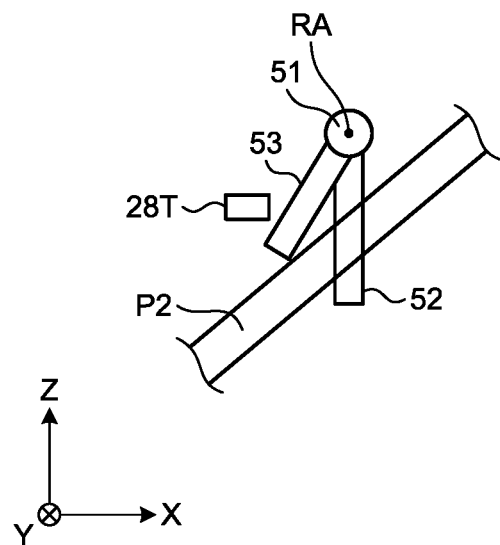
FIG. 3 is a diagram for explaining an operation example of the empty sensor according to the present disclosure.
Figure 4:
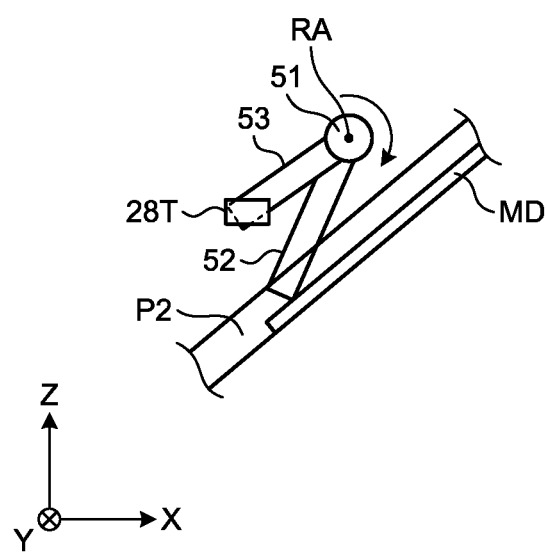
FIG. 4 is a diagram for explaining an operation example of the empty sensor according to the present disclosure.

FIG. 2 is a diagram for explaining a configuration example of an empty sensor according to the present disclosure. FIGS. 3 and 4 are diagrams for explaining operation examples of the empty sensor according to the present disclosure.

As shown in FIG. 2, the empty sensor 23 includes a transmissive optical sensor 28 and a movable member 50. The transmissive optical sensor 28 includes a projector 28T and a receiver 28R. The projector 28T and the receiver 28R are arranged to face each other, and the light projected from the projector 28T is received by the receiver 28R. The projection light amount of the projector 28T is kept constant at the first projection light amount QH under the control of the processor 21. The processor 21 determines, when the reception light amount of the receiver 28R (hereinafter, "third reception light amount") is equal to or greater than the threshold TH1, that the third reception light amount is at the high level H, and determines, when the third reception light amount is less than the threshold TH1, that the third reception light amount is at the low level L. The movable member 50 includes an arm 51 and levers 52 and 53 coupled to the arm 51. The movable member 50 is a member rotatable about an axis RA as a rotation axis.

When the second medium to be read is not placed on the feeding tray 11, the second medium to be read is not present on the conveying path P2 as shown in FIG. 3, and the light projected from the projector 28T is not blocked by the lever 53 and is received by the receiver 28R.

When the second medium to be read MD is placed on the feeding tray 11, the second medium to be read MD is inserted from the opening O2 on the conveying path P2 as shown in FIG. 4, and the lever 52 is pushed up by the second medium to be read MD. When the lever 52 is pushed up by the second medium to be read MD, the movable member 50 rotates clockwise, and the lever 53 moves from the position shown in FIG. 3 to the position shown in FIG. 4 accordingly. Thus, the light projected from the projector 28T is blocked by the lever 53, and the third reception light amount decreases from the high level H to the low level L. The processor 21 starts, when the third reception light amount decreases from the high level H to the low level L, rotating the pick roller 22, the conveying rollers 26-1, 26-2, 27-1, and 27-2 and lowers the tip of the flap 35 toward the lower housing 12. The processor 21 rotates the pick roller 22 and the conveying rollers 26-1 and 27-1 clockwise and rotates the conveying rollers 26-2 and 27-2 clockwise. In addition, since the tip of the flap 35 is lowered toward the lower housing 12, the conveying path P3 and the conveying path P1 are connected, and a series of conveying paths are formed by the conveying path P2, the conveying path P1, and the conveying path P3.

When the leading end of the second medium to be read conveyed on the conveying path P2 by the pick roller 22 passes the junction JP1 and reaches between the conveying roller 27-1 and the conveying roller 27-2, the second medium to be read is conveyed on the conveying path P1 in the −X direction by the conveying rollers 27-1 and 27-2. When the second medium to be read is conveyed on the conveying path P1 in the −X direction by the conveying rollers 27-1 and 27-2 and the leading end of the second medium to be read reaches the transmissive optical sensor 25, the light projected from the projector 25T is blocked by the second medium to be read, and the second reception light amount decreases from the high level H to the low level L. The processor 21 starts, when the second reception light amount decreases from the high level H to the low level L, reading the second medium to be read with the medium reading units 17-1 and 17-2. According to the conveyance of the second medium to be read on the conveying path P1 in the −X direction, the second medium to be read is read by the medium reading units 17-1 and 17-2. The upper face of the second medium to be read is read by the medium reading unit 17-1, and the lower face of the second medium to be read is read by the medium reading unit 17-2.

When the leading end of the second medium to be read reaches between the conveying roller 26-1 and the conveying roller 26-2 according to the further conveyance of the second medium to be read on the conveying path P1 in the −X direction, the second medium to be read is further conveyed on the conveying path P1 in the −X direction by the conveying rollers 26-1 and 26-2. The leading end of the second medium to be read conveyed on the conveying path P1 in the −X direction by the conveying rollers 26-1 and 26-2 moves toward the junction JP3 while contacting with the upper surface of the flap 35 according the conveyance of the second medium to be read, and enters the conveying path P3. Thus, the second medium to be read that has been read is then conveyed on the conveying path P3 in the +Z direction and discharged from the opening O3.

Configuration of Transmissive Optical Sensor

As shown in FIG. 1, the transmissive optical sensor 25 is provided at a position away from both openings O1L and O1R, that is, at a position where ambient light cannot enter. On the other hand, the transmissive optical sensor 24 is provided at a position near the opening O1L, that is, at a position where ambient light is highly likely to enter.

In addition, although a thin medium is only conveyed on the conveying path P2, both thin medium and thick medium are conveyed on the conveying path P1, and the width H1 of the opening O1L in the height direction is larger than the width H2 of the opening O2 in the height direction. Thus, the ambient light entering through the opening O1L is highly likely to reach the position where the transmissive optical sensor 24 is provided.

Figure 5:
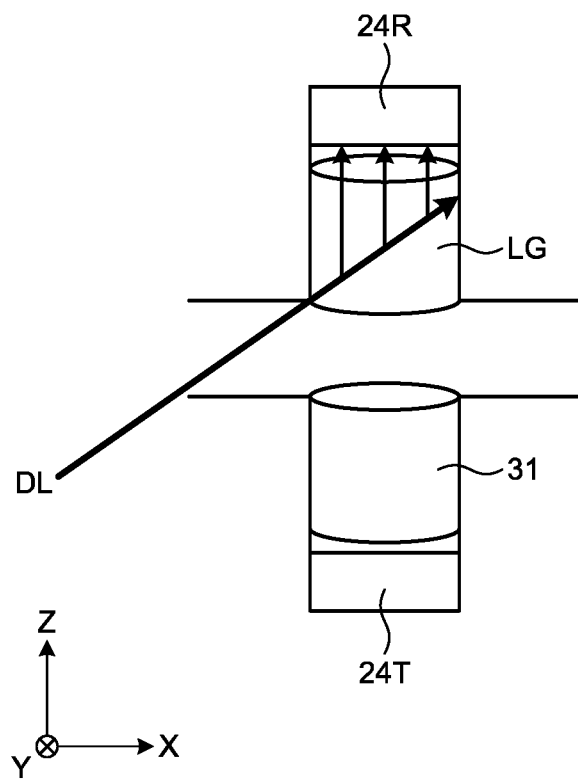
FIG. 5 is a diagram for explaining a configuration example of a transmissive optical sensor according to a comparative example of the present disclosure.

Here, as shown in FIG. 5, if the light guide tube LG is provided on the receiver 24R side of the transmissive optical sensor 24, the ambient light DL entering through the opening O1L is diffused by the light guide tube LG and reaches the receiver 24R, and the first reception light amount is increased by the ambient light DL to the high level H. The increase in the first reception light amount due to ambient light causes erroneous determination whether the first medium to be read is present on the conveying path P1. FIG. 5 is a diagram for explaining a configuration example of a transmissive optical sensor according to a comparative example of the present disclosure.

Figure 6:
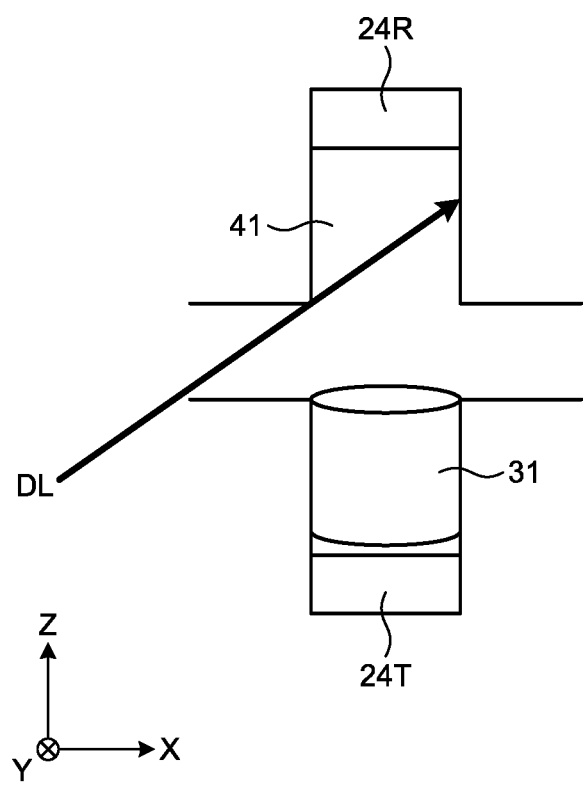
FIG. 6 is a diagram for explaining a configuration example of a transmissive optical sensor according to the first embodiment of the present disclosure.

In contrast, as shown in FIG. 6, although the ambient light DL enters through the opening O1L by providing the hole 41 without the light guide tube LG on the receiver 24R side of the transmissive optical sensor 24, the ambient light DL can be prevented from being diffused by the light guide tube LG, and the ambient light DL can be prevented from reaching the receiver 24R. FIG. 6 is a diagram for explaining a configuration example of the transmissive optical sensor according to the first embodiment of the present disclosure.

For the reason, the light guide tube 33 is provided on the receiver 25R side of the transmissive optical sensor 25 as described above, but the hole 41 is provided on the receiver 24R side of the transmissive optical sensor 24 without the light guide tube.

Processing in Medium Conveying Device

Figure 7:
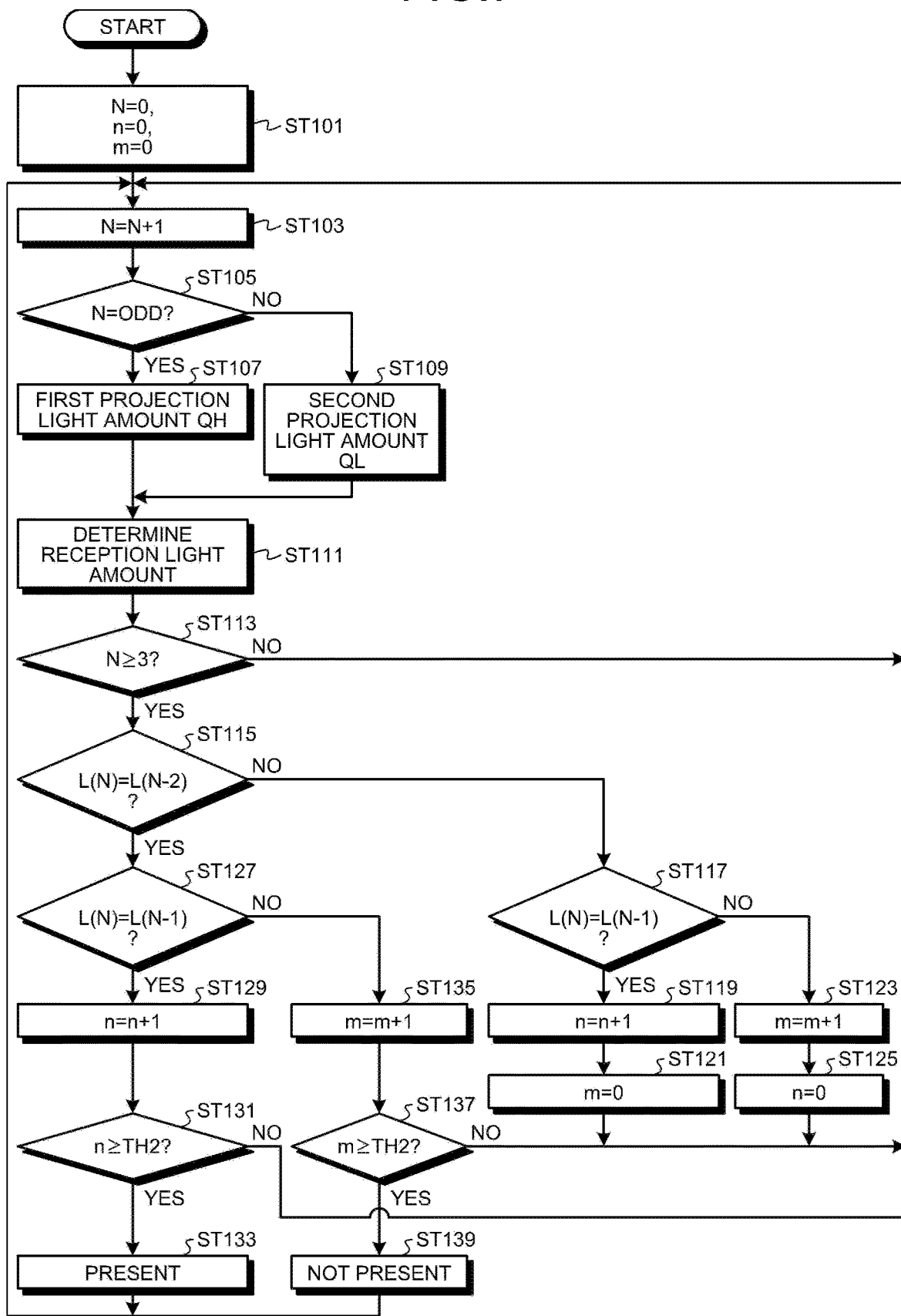
FIG. 7 is a flowchart for explaining an example of a processing procedure in a medium conveying device according to the first embodiment.

FIG. 7 is a flowchart for explaining an example of a processing procedure in the medium conveying device according to the first embodiment. The flowchart shown in FIG. 7 starts from step ST101 when the power of the scanner device 1 is turned on, and ends when the power of the scanner device 1 is turned off. The flowchart shown in FIG. 7 temporarily ends when the "scan start button" (not shown) of the scanner device 1 is pressed, and is restarted from step ST101 after the predetermined time PT passes from the time TA.

First, at step ST101, the processor 21 resets a sampling counter N, a first determination counter n, and a second determination counter m to "0". The values of the sampling counter N, the first determination counter n, and the second determination counter m are stored in the memory 29.

Next, at step ST103, the processor 21 increments the sampling counter N.

Next, at step ST105, the processor 21 determines whether the value of the sampling counter N is odd or even.

When the value of the sampling counter N is odd (step ST105: Yes), the processor 21 controls the projection light amount of the projector 241 to be the first projection light amount QH at step ST107. For example, the processor 21 controls the projection light amount of the projector 241 to be the first projection light amount QH by turning on a light emitting diode (LED) of the projector 241.

On the other hand, when the value of the sampling counter N is even (step ST105: No), the processor 21 controls the projection light amount of the projector 241 to be the second projection light amount QL at step ST109. For example, the processor 21 controls the projection light amount of the projector 241 to be the first projection light amount QH, which is zero, by turning off the LED of the projector 241.

Next, at step ST111, the processor 21 samples the reception light amount of the receiver 24R (that is, the "first reception light amount") at a sampling timing tN ("N" is the value of the sampling counter N), and determines whether the sampled first reception light amount is at the high level H or the low level L.

Next, at step ST113, the processor 21 determines whether the value of the sampling counter N is equal to or greater than "3". When the value of the sampling counter N is less than "3" (step ST113: No), the processing is returned to step ST103, and the processing at steps ST103 to ST111 is repeated.

On the other hand, when the value of the sampling counter N reaches "3" (step ST113: Yes), the processor 21 determines whether the reception light level of the first reception light amount determined at the N-th time (hereinafter, "reception light level L(N)") is the same as the reception light level of the first reception light amount determined at the (N−2)-th time (hereinafter, "reception light level L(N−2)") at step ST115. When the reception light level L(N) is the same as the reception light level L(N−2) (step ST115: Yes), the processing proceeds to step ST127, or when the reception light level L(N) is different from the reception light level L(N−2) (step ST115: No), the processing proceeds to step ST117.

At step ST117, the processor 21 determines whether the reception light level L(N) is the same as the reception light level of the first reception light amount determined at the (N−1)-th time (hereinafter, "reception light level L(N−1)").

When the reception light level L(N) is the same as the reception light level L(N−1) at step ST117 (step ST117: Yes), the processor 21 increments the first determination counter n at step ST119, and resets the second determination counter m reset to "0" at step ST121.

On the other hand, when the reception light level L(N) is different from the reception light level L(N−1) at step ST117 (step ST117: No), the processor 21 increments the second determination counter m at step ST123, and resets the first determination counter n to "0" at step ST125.

After the processing at step ST121 or step ST125, the processing is returned to step ST103.

At step ST127, the processor 21 determines whether the reception light level L(N) is the same as the reception light level L(N−1).

When the reception light level L(N) is the same as the reception light level L(N−1) at step ST127 (step ST127: Yes), the processor 21 increments the first determination counter n at step ST129.

Next, at step ST131, the processor 21 determines whether the value of the first determination counter n is equal to or greater than the threshold TH2. When the value of the first determination counter n is less than the threshold TH2 (step ST131: No), the processing is returned to step ST103. On the other hand, when the value of the first determination counter n reaches the threshold TH2 (step ST131: Yes), the processor 21 determines that the first medium to be read is present on the conveying path P1 at step ST133. After the processing at step ST133, the processing is returned to step ST103.

On the other hand, when the reception light level L(N) is different from the reception light level L(N−1) at step ST127 (step ST127: No), the processor 21 increments the second determination counter m at step ST135.

Next, at step ST137, the processor 21 determines whether the value of the second determination counter m is equal to or greater than the threshold TH2. When the value of the second determination counter m is less than the threshold TH2 (step ST137: No), the processing is returned to step ST103. On the other hand, when the value of the second determination counter m reaches the threshold TH2 (step ST137: Yes), the processor 21 determines that the first medium to be read is not present on the conveying path P1 at step ST139. After the processing at step ST139, the processing is returned to step ST103.

Operation of Medium Conveying Device

Figure 8:
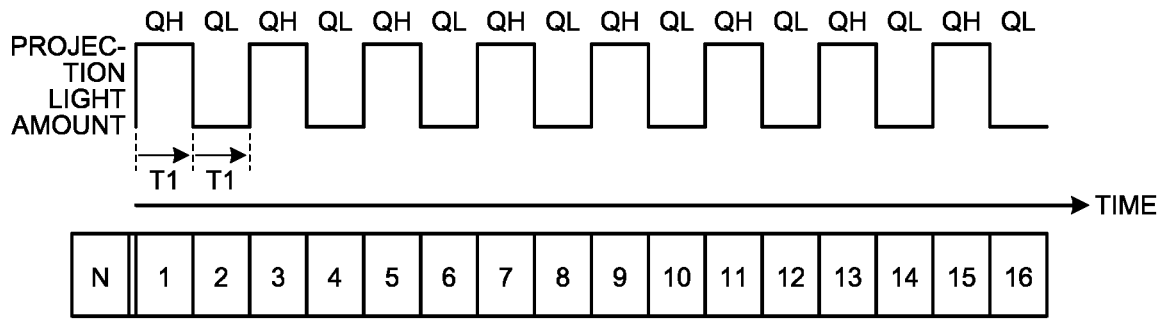
FIG. 8 is a diagram for explaining an operation example of the medium conveying device according to the first embodiment of the present disclosure.
Figure 9:
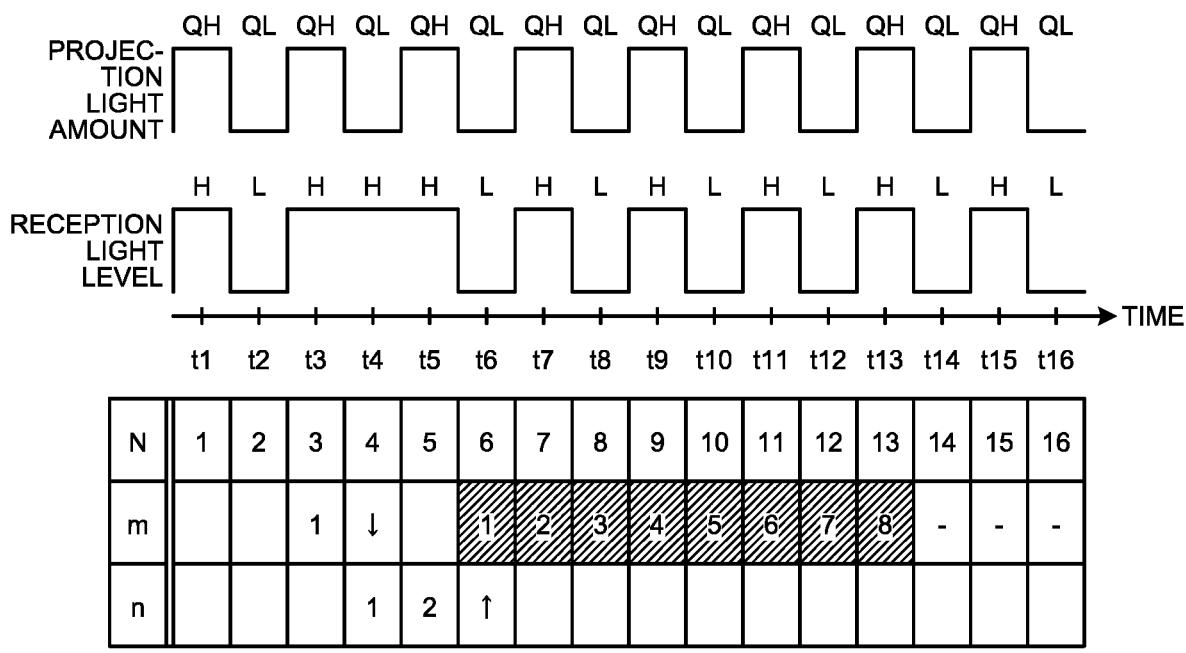
FIG. 9 is a diagram for explaining the operation example of the medium conveying device according to the first embodiment of the present disclosure.
Figure 10:
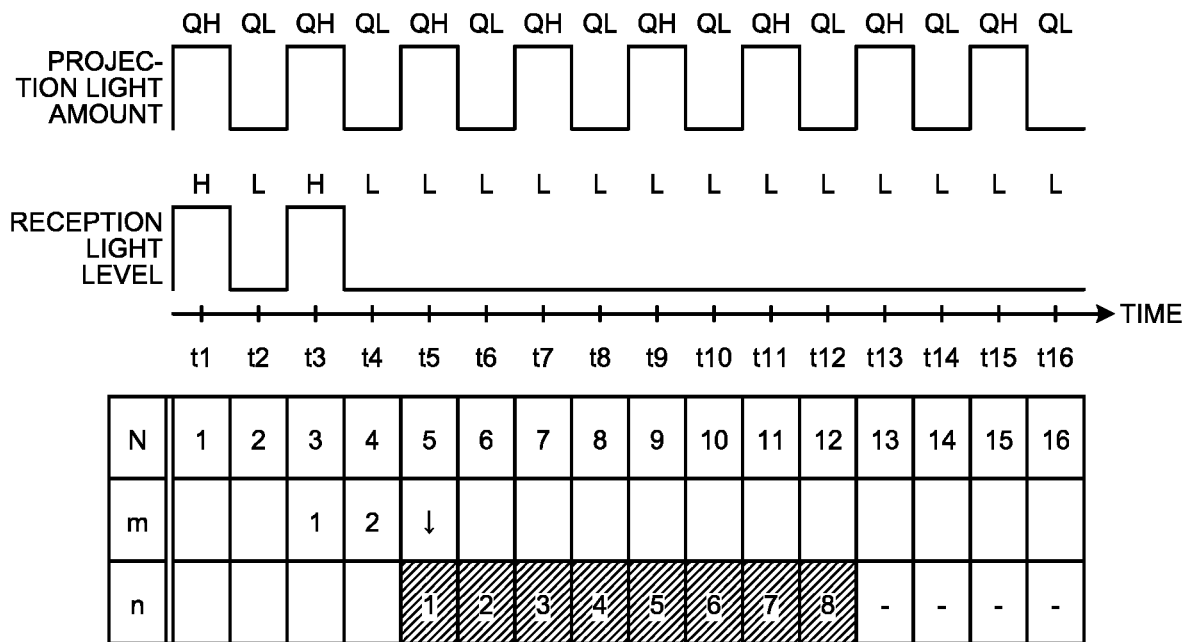
FIG. 10 is a diagram for explaining the operation example of the medium conveying device according to the first embodiment of the present disclosure.
Figure 11:
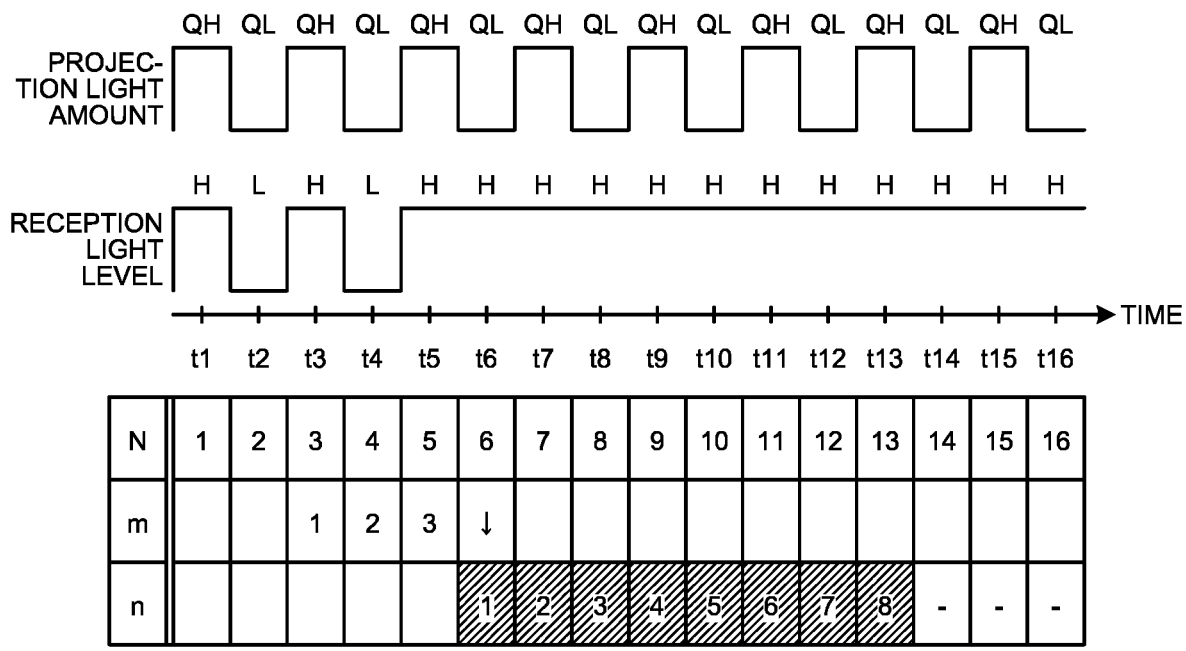
FIG. 11 is a diagram for explaining the operation example of the medium conveying device according to the first embodiment of the present disclosure.

FIGS. 8, 9, 10, and 11 are diagrams for explaining an operation example of the medium conveying device according to the first embodiment of the present disclosure. FIG. 8 depicts an example of a change in the projection light amount of the projector 241. FIGS. 9, 10, and FIG. 11 show examples of the determination results of the reception light level of the first reception light amount.

As shown in FIG. 8, the processor 21 changes the projection light amount of the projector 241 to the first projection light amount QH and the second projection light amount QL at every fixed time T1 (that is, at a fixed period "T1×2"). That is, when the value of the sampling counter N is odd (step ST105: Yes), the processor 21 controls the projection light amount of the projector 241 to be the first projection light amount QH (step ST107), or when the value of the sampling counter N is even (step ST105: No), the processor 21 controls the projection light amount of the projector 241 to be the second projection light amount QL (step ST109). The time T1 is set to a time different from the on-time and the off-time of an indoor light that performs pulse lighting and is set to, for example, 12.5 milliseconds.

In contrast to the projection light amount that changes as shown in FIG. 8, FIG. 9 depicts an example of the determination result of the reception light level when the first medium to be read is not present on the conveying path P1 and ambient light is not received by the receiver 24R (hereinafter, "case C1"), or when the first medium to be read is not present on the conveying path P1 and ambient light is received by the receiver 24R (hereinafter, "case C2"). FIG. 10 depicts an example of the determination result of the reception light level when the first medium to be read is present on the conveying path P1 and ambient light is not received by the receiver 24R (hereinafter, "case C3"). FIG. 11 depicts an example of the determination result of the reception light level when the first medium to be read is present on the conveying path P1 and ambient light is received by the receiver 24R (hereinafter, "case C4").

In the following, presence determination of the first medium to be read on the conveying path P1 (hereinafter, "presence determination") will be described in the cases C1, C2, C3, and C4. In any of the cases C1, C2, C3, and C4, the processor 21 determines whether the reception light level of the receiver 24R that receives the light the projection light amount of which changes as shown in FIG. 8 is at the high level H or the low level L at fixed sampling timings t1 to t16 (FIGS. 9, 10, and 11). The time interval between adjacent sampling timings during the sampling timings t1 to t16 is constant and the time T1. In addition, each of the sampling timings t1 to t16 corresponds to the values 1 to 16 of the sampling counter N, respectively. In the following, the case in which the threshold TH2 is set to "8" will be described as an example.

Presence Determination in Case C1 (FIG. 9)

In the case C1, since the first medium to be read is not present on the conveying path P1, the light projected from the projector 241 is not blocked by the first medium to be read and reaches the receiver 24R. Thus, according to the change in the projection light amount to the first projection light amount QH and the second projection light amount QL alternately, the reception light level determined by the processor 21 normally changes to the high level H and the low level L alternately.

Thus, as shown in FIG. 9, in accordance with the processing procedure shown in FIG. 7, the processor 21 determines, at the sampling timing t3, that the reception light level L(3) is the high level H and the same as the reception light level L(1) (step ST115: Yes) and that the reception light level L(3) is different from the reception light level L(2), which is the low level L, (step ST127: No), and increments the second determination counter m to "1" (step ST135).

Next, at the sampling timing t4, it is assumed that the processor 21 erroneously determines the reception light level L(4), which is to be originally determined to be the low level L, to be the high level H because noise temporarily enters the light projected from the projector 241. Thus, at the sampling timing t4, the processor 21 determines that the reception light level L(4) is different from the reception light level L(2), which is the low level L, (step ST115: No) and that the reception light level L(4) is the same as the reception light level L(3), which is the high level H, (step ST127: Yes), and increments the first determination counter n to "1" (step ST119) and resets the second determination counter m to "0" (step ST121).

Next, at the sampling timing t5, the processor 21 determines that the reception light level L(5) is the high level H and the same as the reception light level L(3) (step ST115: Yes) and that the reception light level L(5) is the same as the reception light level L(4), which is the high level H (step ST127: Yes), and increments the first determination counter n to "2" (step ST129).

Next, at the sampling timing t6, the processor 21 determines that the reception light level L(6), which is the low level L, is different from the reception light level L(4), which is the high level H, (step ST115: No) and that the reception light level L(6) is different from the reception light level L(5), which is the high level H, (step ST117: No), and increments the second determination counter m to "1" (step ST123) and resets the first determination counter n to "0" (step ST125).

Next, at the sampling timing t7, the processor 21 determines that the reception light level L(7) is the high level H and the same as the reception light level L(5) (step ST115: Yes) and that the reception light level L(7) is different from the reception light level L(6), which is the low level L, (step ST127: No), and increments the second determination counter m to "2" (step ST135).

Next, at the sampling timing t8, the processor 21 determines that the reception light level L(8) is the low level L and the same as the reception light level L(6) (step ST115: Yes) and that the reception light level L(8) is different from the reception light level L(7), which is the high level H, (step ST127: No), and increments the second determination counter m to "3" (step ST135).

Next, at the sampling timing t9, the processor 21 determines that the reception light level L(9) is the high level H and the same as the reception light level L(7) (step ST115: Yes) and that the reception light level L(9) is different from the reception light level L(8), which is the low level L, (step ST127: No), and increments the second determination counter m to "4" (step ST135).

Next, at the sampling timing t10, the processor 21 determines that the reception light level L(10) is the low level L and the same as the reception light level L(8) (step ST115: Yes) and that the reception light level L(10) is different from the reception light level L(9), which is the high level H, (step ST127: No), and increments the second determination counter m to "5" (step ST135).

Next, at the sampling timing t11, the processor 21 determines that the reception light level L(11) is the high level H and the same as the reception light level L(9) (step ST115: Yes) and that the reception light level L(11) is different from the reception light level L(10), which is the low level L, (step ST127: No), and increments the second determination counter m to "6" (step ST135).

Next, at the sampling timing t12, the processor 21 determines that the reception light level L(12) is the low level L and the same as the reception light level L(10) (step ST115: Yes) and that the reception light level L(12) is different from the reception light level L(11), which is the high level H, (step ST127: No), and increments the second determination counter m to "7" (step ST135).

Next, at the sampling timing t13, the processor 21 determines that the reception light level L(13) is the high level H and the same as the reception light level L(11) (step ST115: Yes) and that the reception light level L(13) is different from the reception light level L(12), which is the low level L, (step ST127: No), and increments the second determination counter m to "8" (step ST135). As the result, the value of the second determination counter m reaches the threshold TH2 (step ST137: Yes). Thus, the processor 21 determines that the first medium to be read is not present on the conveying path P1 when the sampling timing is t13 (step ST139).

As described above, the processor 21 determines that the first medium to be read is not present on the conveying path P1 when the first reception light amount alternately changes to the high level and the low level at predetermined eight sampling timings that is the same number as the value of the threshold TH2.

Presence Determination in Case C2 (FIG. 9)

In the case C2, since the first medium to be read is not present on the conveying path P1, the light projected from the projector 24T is not blocked by the first medium to be read and reaches the receiver 24R, similarly to the case C1.

When ambient light is natural light or light from an indoor light continuously lit, the light amount of the ambient light does not change up and down at every fixed time, unlike the projection light amount shown in FIG. 8. In addition, when ambient light is generated by a pulse-lighting indoor light, the time T1 is set to a time different from the on-time and the off-time of the pulse-lighting indoor light as described above.

Furthermore, since the transmissive optical sensor 24 has the configuration shown in FIG. 6, the ambient light entering through the lower part of the opening O1L can be prevented from reaching the receiver 24R although the first medium to be read is not present on the conveying path P1.

Moreover, since the lower surface S12 is formed of a non-reflective member that does not reflect ambient light as described above, the ambient light entering through the upper part of the opening O1L can be prevented from being reflected by the lower surface S12 and reaching the receiver 24R although the first medium to be read is not present on the conveying path P1.

For this reason, according to the change in the projection light amount to the first projection light amount QH and the second projection light amount QL alternately, the reception light level determined by the processor 21 normally changes to the high level H and the low level L alternately.

Thus, the presence determination in the case C2 is the same as the case C1 (FIG. 9).

Presence Determination in Case C3 (FIG. 10)

FIG. 10 depicts an example of the case in which the first medium to be read is conveyed on the conveying path P1 in the +X direction with the passage of time, and the leading end of the first medium to be read reaches the position where the transmissive optical sensor 24 is provided when the sampling timing is t4.

As shown in FIG. 10, in accordance with the processing procedure shown in FIG. 7, the processor 21 determines, at the sampling timing t3, that the reception light level L(3) is the high level H and the same as the reception light level L(1) (step ST115: Yes) and that the reception light level L(3) is different from the reception light level L(2), which is the low level L, (step ST127: No), and increments the second determination counter m to "1" (step ST135).

Next, at the sampling timing t4, the processor 21 determines that the reception light level L(4) is the low level L and the same as the reception light level L(2) (step ST115: Yes) and that the reception light level L(4) is different from the reception light level L(3), which is the high level H, (step ST127: No), and increments the second determination counter m to "2" (step ST135).

Next, at the sampling timing t5, the processor 21 determines that the reception light level L(5), which is the low level L, is different from the reception light level L(3), which is the high level H, (step ST115: No) and that the reception light level L(5) is the same as the reception light level L(4), which is the low level L, (step ST117: Yes), and increments the first determination counter n to "1" (step ST119) and resets the second determination counter m to "0" (step ST121).

Next, at the sampling timing t6, the processor 21 determines that the reception light level L(6) is the low level L and the same as the reception light level L(4) (step ST115: Yes) and that the reception light level L(6) is the same as the reception light level L(5), which is the low level L, (step ST127: Yes), and increments the first determination counter n to "2" (step ST129).

Next, at the sampling timing t7, the processor 21 determines that the reception light level L(7) is the low level L and the same as the reception light level L(5) (step ST115: Yes) and that the reception light level L(7) is the same as the reception light level L(6), which is the low level L, (step ST127: Yes), and increments the first determination counter n to "3" (step ST129).

Next, at the sampling timing t8, the processor 21 determines that the reception light level L(8) is the low level L and the same as the reception light level L(6) (step ST115: Yes) and that the reception light level L(8) is the same as the reception light level L(7), which is the low level L, (step ST127: Yes), and increments the first determination counter n to "4" (step ST129).

Next, at the sampling timing t9, the processor 21 determines that the reception light level L(9) is the low level L and the same as the reception light level L(7) (step ST115: Yes) and that the reception light level L(9) is the same as the reception light level L(8), which is the low level L, (step ST127: Yes), and increments the first determination counter n to "5" (step ST129).

Next, at the sampling timing t10, the processor 21 determines that the reception light level L(10) is the low level L and the same as the reception light level L(8) (step ST115: Yes) and that the reception light level L(10) is the same as the reception light level L(9), which is the low level L, (step ST127: Yes), and increments the first determination counter n to "6" (step ST129).

Next, at the sampling timing t11, the processor 21 determines that the reception light level L(11) is the low level L and the same as the reception light level L(9) (step ST115: Yes) and that the reception light level L(11) is the same as the reception light level L(10), which is the low level L, (step ST127: Yes), and increments the first determination counter n to "7" (step ST129).

Next, at the sampling timing t12, the processor 21 determines that the reception light level L(12) is the low level L and the same as the reception light level L(10) (step ST115: Yes) and that the reception light level L(12) is the same as the reception light level L(11), which is the low level L, (step ST127: Yes), and increments the first determination counter n to "8" (step ST129). As the result, the value of the first determination counter n reaches the threshold TH2 (step ST131: Yes). Thus, the processor 21 determines that the first medium to be read is present on the conveying path P1 when the sampling timing is t12 (step ST133).

As described above, the processor 21 determines that the first medium to be read is present on the conveying path P1 when the first reception light amount is fixed at the low level L. The processor 21 further determines that the first reception light amount is fixed at the low level L when determining that the first reception light amount is continuously at the low level L at all of predetermined eight sampling timings that is the same number as the value of the threshold TH2.

Presence Determination in Case C4

FIG. 11 depicts an example of the case in which the first medium to be read is conveyed on the conveying path P1 in the +X direction with the passage of time, and the leading end of the first medium to be read reaches the position where the transmissive optical sensor 24 is provided when the sampling timing is t4. In addition, FIG. 11 depicts an example of the case in which ambient light entering through the upper part of the opening O1L after the sampling timing reaches t5 is reflected by the upper surface of the first medium to be read and received by the receiver 24R. Furthermore, FIG. 11 depicts an example of the case in which the ambient light entering through the upper part of the opening O1L is natural light or light of an indoor light that does not pulse but is continuously lit.

As shown in FIG. 11, in accordance with the processing procedure shown in FIG. 7, the processor 21 determines, at the sampling timing t3, that the reception light level L(3) is the high level H and the same as the reception light level L(1) (step ST115: Yes) and that the reception light level L(3) is different from the reception light level L(2), which is the low level L, (step ST127: No), and increments the second determination counter m to "1" (step ST135).

Next, at the sampling timing t4, the processor 21 determines that the reception light level L(4) is the low level L and the same as the reception light level L(2) (step ST115: Yes) and that the reception light level L(4) is different from the reception light level L(3), which is the high level H, (step ST127: No), and increments the second determination counter m to "2" (step ST135).

Next, at the sampling timing t5, the processor 21 determines that the reception light level L(5) is the high level H and the same as the reception light level L(3) (step ST115: Yes) and that the reception light level L(5) is different from the reception light level L(4), which is the low level L, (step ST127: No), and increments the second determination counter m to "3" (step ST135).

Next, at the sampling timing t6, the processor 21 determines that the reception light level L(6), which is the high level H, is different from the reception light level L(4), which is the low level L, (step ST115: No) and that the reception light level L(6) is the same as the reception light level L(5), which is the high level H, (step ST117: Yes), and increments the first determination counter n to "1" (step ST119) and resets the second determination counter m to "0" (step ST121).

Next, at the sampling timing t7, the processor 21 determines that the reception light level L(7) is the high level H and the same as the reception light level L(5) (step ST115: Yes) and that the reception light level L(7) is the same as the reception light level L(6), which is the high level H (step ST127: Yes), and increments the first determination counter n to "2" (step ST129).

Next, at the sampling timing t8, the processor 21 determines that the reception light level L(8) is the high level H and the same as the reception light level L(6) (step ST115: Yes) and that the reception light level L(8) is the same as the reception light level L(7), which is the high level H, (step ST127: Yes), and increments the first determination counter n to "3" (step ST129).

Next, at the sampling timing t9, the processor 21 determines that the reception light level L(9) is the high level H and the same as the reception light level L(7) (step ST115: Yes) and that the reception light level L(9) is the same as the reception light level L(8), which is the high level H, (step ST127: Yes), and increments the first determination counter n to "4" (step ST129).

Next, at the sampling timing t10, the processor 21 determines that the reception light level L(10) is the high level H and is the same as the reception light level L(8) (step ST115: Yes) and that the reception light level L(10) is the same as the reception light level L(9), which is the high level H, (step ST127: Yes), and increments the first determination counter n to "5" (step ST129).

Next, at the sampling timing t11, the processor 21 determines that the reception light level L(11) is the high level H and the same as the reception light level L(9) (step ST115: Yes) and that the reception light level L(11) is the same as the reception light level L(10), which is the high level H, (step ST127: Yes), and increments the first determination counter n to "6" (step ST129).

Next, at the sampling timing t12, the processor 21 determines that the reception light level L(12) is the high level H and the same as the reception light level L(10) (step ST115: Yes) and that the reception light level L(12) is the same as the reception light level L(11), which is the high level H, (step ST127: Yes), and increments the first determination counter n to "7" (step ST129).

Next, at the sampling timing t13, the processor 21 determines that the reception light level L(13) is the high level H and the same as the reception light level L(11) (step ST115: Yes) and that the reception light level L(13) is the same as the reception light level L(12), which is the high level H, (step ST127: Yes), and increments the first determination counter n to "8" (step ST129). As the result, the value of the first determination counter n reaches the threshold TH2 (step ST131: Yes). Thus, the processor 21 determines that the first medium to be read is present on the conveying path P1 when the sampling timing is t13 (step ST133).

As described above, the processor 21 determines that the first medium to be read is present on the conveying path P1 when the first reception light amount is fixed at the high level H. The processor 21 further determines that the first reception light amount is fixed at the high level H when determining that the first reception light amount is continuously at the high level H at all of predetermined eight sampling timings that is the same number as the value of the threshold TH2.

The Cases C1 to C4 have been Described Above.

The processor 21 performs the presence determination and starts, when the determination result changes from "not present" to "present", rotating the conveying rollers 26-1, 26-2, 27-1, and 27-2 The processor 21 performs the presence determination and stops, when the determination result changes from "present" to "not present", rotating the conveying rollers 26-1, 26-2, 27-1, and 27-2. The processor 21 performs the presence determination and maintains, when the determination result does not change from "present" or "not present", rotating the conveying rollers 26-1, 26-2, 27-1, and 27-2 when they are rotated, and stopping the conveying rollers 26-1, 26-2, 27-1, and 27-2 when they are stopped.

Note that, when a reflective optical sensor is used for the presence determination instead of the transmissive optical sensor 24, the light projected from the projector is reflected by the first medium to be read, and the first medium to be read is determined to be present on the conveying path P1 when the reception light amount of the receiver increases. However, the reflected light can be weak depending on the material used for printing the first medium to be read, and the presence determination can be difficult to perform with the reflective optical sensor. In addition, the reflected light can be also weak when the first medium to be read is contained in a transparent medium, such as a carrier sheet or a clear file folder, the presence determination can be difficult to perform with the reflective optical sensor. For these reasons, the transmissive optical sensor 24 is used for the presence determination in the medium conveying device 20 according to the present disclosure.

The first embodiment has been described above.

[b] Second Embodiment

In the first embodiment, the case in which the medium conveying device 20 is applied to the scanner device 1 including the medium reading units 17-1 and 17-2 has been described as an example. However, the medium conveying device 20 can be applied to a printer device including a print head instead of the medium reading units 17-1 and 17-2. When the medium conveying device 20 is applied to a printer device, the medium to be read is substituted by a medium to be printed by the printer device (that is, a medium to be printed).

The second embodiment has been described above.

[c] Third Embodiment

All or a part of the processing in the processor 21 may be performed by causing the processor 21 to execute a program corresponding to the processing. For example, the program corresponding to the processing may be stored in the memory 29, and the program may be read from the memory 29 and executed by the processor 21. In addition, the program may be stored in a program server connected to the scanner device 1 via any network and downloaded from the program server to the scanner device 1 and executed, or stored in a recording medium readable by the scanner device 1 and read from the recording medium and executed. The recording medium readable by the scanner device 1 includes a portable medium, such as a memory card, a universal serial bus (USB) memory, a secure digital (SD) card, a flexible disk, a magneto-optical disk, a compact disc read-only memory (CD-ROM), a digital versatile disc (DVD), or a Blu-ray (registered trademark) disk. In addition, the program is a data processing method described in any language or any description method, and may be in any format, such as a source code or a binary code. In addition, the program is not necessarily limited to a single program, and may be distributed as a plurality of modules or libraries, or achieve its function in cooperation with a separate program represented by an operation system (OS).

The specific form of distribution/integration of the medium conveying device 20 is not limited to the illustrated one, and all or a part of the medium conveying device 20 can be, according to various additions or the like or to a functional load, distributed or integrated functionally or physically.

The third embodiment has been described above.

As described above, medium conveying device according to the present disclosure (the medium conveying device 20 according the first embodiment) includes a first conveying path (the conveying path P1 according to the first embodiment), an optical sensor (the transmissive optical sensor 24 according to the first embodiment), and a processor (the processor 21 according to the first embodiment). The first conveying path includes a first opening (the opening O1L according the first embodiment), an upper surface (the upper surface S11 according the first embodiment), and a lower surface (the lower surface S12 according the first embodiment), and is used to convey a first medium (the first medium to be read according the first embodiment) inserted from the first opening. The optical sensor includes a projector (the projector 24T according the first embodiment) and a receiver (the receiver 24R according the first embodiment). The projector is arranged on the lower surface side of the first conveying path, and projects light toward the upper surface of the first conveying path, the projection light amount of the light changes, at every fixed time, to a first projection light amount (the first projection light amount QH according the first embodiment) and to a second projection light amount (the second projection light amount QL according the first embodiment) less than the first projection light amount. The receiver is arranged on the upper surface side of the first conveying path to face the projector, and receives the light projected from the projector. The processor determines, at fixed sampling timings, whether the reception light amount of the receiver (the first reception light amount according to the first embodiment) is at a first reception light level (the high level H according to the first embodiment) or a second reception light level smaller than the first reception light level (the low level L according to the first embodiment), determines, when the reception light amount alternately changes to the first reception light level and the second reception light level, that the first medium is not present on the first conveying path, and determines, when the reception light amount is fixed at either the first reception light level or the second reception light level, that the first medium is present on the first conveying path.

This makes it possible to prevent erroneous determination whether the first medium is present on the first conveying path although there is ambient light.

In addition, the medium conveying device according to the present disclosure includes a light guide tube (the light guide tube 31 according to the first embodiment) and a hole (the hole 41 according to the first embodiment). The light guide tube is arranged between the projector and the lower surface of the first conveying path, and guides the light projected from the projector to the lower surface of the first conveying path. The hole passes through between the upper surface of the first conveying path and the receiver.

This makes it possible to prevent ambient light entering through the first opening from being diffused by the light guide tube, and to prevent the ambient light from reaching the receiver.

In addition, the processor determines that the reception light amount is fixed at the first reception light level when determining that the reception light amount is continuously at the first reception light level at all of a predetermined number of sampling timings (eight sampling timings in the first embodiment), and determines that the reception light amount is fixed at the second reception light level when determining that the reception light amount is continuously at the second reception light level at all of the predetermined number of sampling timings.

This makes it possible to correctly determine whether the first medium is present on the first conveying path although noise temporarily enters the light projected from the projector.

Furthermore, the medium conveying device according to the present disclosure includes a second conveying path (the conveying path P2 according to the first embodiment). The second conveying path includes a second opening (the opening O2 according to the first embodiment), joins the first conveying path midway through the first conveying path, and is used to convey a second medium (the second medium to be read according to the first embodiment) inserted from the second opening. The width of the first opening in the height direction (the width H1 according to the first embodiment) is larger than the width of the second opening in the height direction (the width H2 according to the first embodiment).

This makes it possible to present erroneous determination whether the first medium is present on the vicinity of the first opening where ambient light is more likely to enter.

According to an aspect of the disclosure, although there is ambient light, erroneous determination whether a medium is present on a conveying path can be prevented.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medium conveying device comprising:
a first conveying path; an optical sensor; and a processor, wherein
the first conveying path includes: a first opening; an upper surface; and a lower surface, and the first conveying path is used to convey a first medium inserted from the first opening,
the optical sensor includes a projector and a receiver, the projector is arranged on the lower surface side and projects light toward the upper surface, a projection light amount of the light changes, at a fixed time, to a first projection light amount and to a second projection light amount less than the first projection light amount, and the receiver is arranged on the upper surface side to face the projector and receives the light projected from the projector, and
when ambient light is received by the receiver, the ambient light being light having a light source outside the medium conveying device and entering the first conveying path through the first opening from outside of the medium conveying device, the processor determines, at fixed sampling timings, whether a reception light amount of the receiver is at a first reception light level or a second reception light level smaller than the first reception light level, determines, when the reception light amount alternately changes to the first reception light level and the second reception light level, that the first medium is not present on the first conveying path, and determines, when the reception light amount is fixed at either the first reception light level or the second reception light level, that the first medium is present on the first conveying path.

2. The medium conveying device according to claim 1, further comprising:
a light guide tube that is arranged between the projector and the lower surface, and that guides the light projected from the projector to the lower surface; and
a hole passing through between the upper surface and the receiver.

3. The medium conveying device according to claim 1, wherein the processor determines, when determining that the reception light amount is continuously at the first reception light level at all of a predetermined number of the sampling timings, that the reception light amount is fixed at the first reception light level, and determines, when determining that the reception light amount is continuously at the second reception light level at all of the predetermined number of the sampling timings, that the reception light amount is fixed at the second reception light level.

4. The medium conveying device according to claim 1, further comprising a second conveying path, wherein
the second conveying path includes a second opening, is used to convey a second medium inserted from the second opening, and joins the first conveying path midway through the first conveying path, and
a width of the first opening in a height direction is larger than a width of the second opening in the height direction.

5. A determination method executed by a medium conveying device including: a conveying path; an optical sensor; and a processor, wherein
the conveying path includes: an opening; an upper surface; and a lower surface, the conveying path is used to convey a medium inserted from the opening,
the optical sensor includes a projector and a receiver, the projector is arranged on the lower surface side and projects light toward the upper surface, a projection light amount of the light changes, at a fixed time, to a first projection light amount and to a second projection light amount less than the first projection light amount, the receiver is arranged on the upper surface side to face the projector and receives the light projected from the projector,
the method executed by the processor comprising:
when ambient light is received by the receiver, the ambient light being light having a light source outside the medium conveying device and entering the conveying path through the opening from outside of the medium conveying device,
determining, at fixed sampling timings, whether a reception light amount of the receiver is at a first reception light level or a second reception light level smaller than the first reception light level;
determining, when the reception light amount alternately changes to the first reception light level and the second reception light level, that the medium is not present on the conveying path; and
determining, when the reception light amount is fixed at either the first reception light level or the second reception light level, that the medium is present on the conveying path.

* * * * *